United States Patent
Celik

(10) Patent No.: US 10,055,572 B1
(45) Date of Patent: Aug. 21, 2018

(54) SYSTEMS AND METHODS FOR PREVENTING WINDOWS KERNEL CODE OR DRIVERS FROM BEING EXECUTED

(71) Applicant: Mucteba Celik, Jersey City, NJ (US)

(72) Inventor: Mucteba Celik, Jersey City, NJ (US)

(*) Notice: Subject to any disclaimer, the term of this patent is extended or adjusted under 35 U.S.C. 154(b) by 0 days.

(21) Appl. No.: 15/717,098

(22) Filed: Sep. 27, 2017

Related U.S. Application Data

(60) Provisional application No. 62/518,068, filed on Jun. 12, 2017.

(51) Int. Cl.
  *G06F 21/00* (2013.01)
  *G06F 21/44* (2013.01)
  *G06F 9/4401* (2018.01)

(52) U.S. Cl.
  CPC ............ *G06F 21/44* (2013.01); *G06F 9/4411* (2013.01)

(58) Field of Classification Search
  CPC .......... G06F 21/44; G06F 21/45; G06F 21/50; G06F 21/121; G06F 9/4406; G06F 9/4411
  USPC ........... 726/16, 17, 22–24, 26–27, 30; 713/2
  See application file for complete search history.

(56) References Cited

U.S. PATENT DOCUMENTS

| | | | |
|---|---|---|---|
| 5,459,867 A * | 10/1995 | Adams | G06F 9/4843 710/63 |
| 7,174,447 B2 * | 2/2007 | Zimmer | G06F 9/4411 713/1 |
| 7,543,335 B2 * | 6/2009 | England | G06F 9/4405 713/193 |
| 8,140,839 B2 * | 3/2012 | Wang | G06F 21/575 713/1 |
| 8,151,109 B2 * | 4/2012 | Fanton | G06F 21/10 380/270 |
| 2017/0220795 A1 * | 8/2017 | Suginaka | G06F 21/45 |

* cited by examiner

*Primary Examiner* — Hosuk Song
(74) *Attorney, Agent, or Firm* — Dunlap Bennett & Ludwig PLLC; Brendan E. Squire

(57) ABSTRACT

Systems and methods for preventing drivers from being loaded in Windows® OS kernel space. A security driver according to aspects of the invention is loaded in kernel space and is configured to register a filter to provide a notification in the event of an ImageLoad. So configured, the Windows® kernel provides a notification on all executables being loaded to the kernel on a first method and all file system related activities for a second method before executing them. The user may then selectively determine whether the executable or the file system related activities may be executed.

23 Claims, 3 Drawing Sheets

SYSTEMS AND METHODS FOR PREVENTING WINDOWS KERNEL CODE OR DRIVERS FROM BEING EXECUTED

CROSS-REFERENCE TO RELATED APPLICATION

This application claims the benefit of priority of U.S. provisional application No. 62/518,068, filed Jun. 12, 2017, the contents of which are herein incorporated by reference.

BACKGROUND OF THE INVENTION

The present invention relates to computer security, and more particularly to preventing unwanted windows drivers from being loaded and/or executed.

Allowing a new driver (signed or unsigned) to access the kernel can completely disarm a security product and make it useless. Presently, there is no method for preventing drivers, particularly signed drivers from being loaded into an operating system (OS) kernel layer. Consequently, hackers find different ways of bypassing driver signature enforcement, such as stolen code signing certificates being used for signing malicious drivers, and various methods of bypassing driver signing enforcement in Windows® OS kernel space. Simply a signed driver with access to kernel can disarm all endpoint security products. All endpoint security products and anti-viruses are vulnerable to this attack.

When improving the security of Windows® operating system (OS) software, it is desirable to prevent new drivers from being loaded in and accessing the kernel space in Windows®. Windows® API and Windows® documentation does not provide any way of doing so.

As can be seen, there is a need for a system and method for selectively blocking unwanted drivers from being loaded and/or executed in kernel space.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a computer user the ability to decide which drivers and applications are permitted access to a kernel space. The present invention is able to patch drivers in memory before they access the kernel space. This way the computer user can decide which drivers are allowed and which ones are not allowed access to the kernel space.

As stated above, when improving the security of Windows® operating system (OS) software and security software, it is desirable to prevent new drivers from being loaded and accessing kernel space in Windows®. Windows® API and Windows® documentation does not provide any way of doing so. The present system and method is able to do so by patching drivers in memory before they access the kernel space. This way the computer user can decide which drivers are allowed and which ones are not permitted access to the kernel space.

Figure 1:
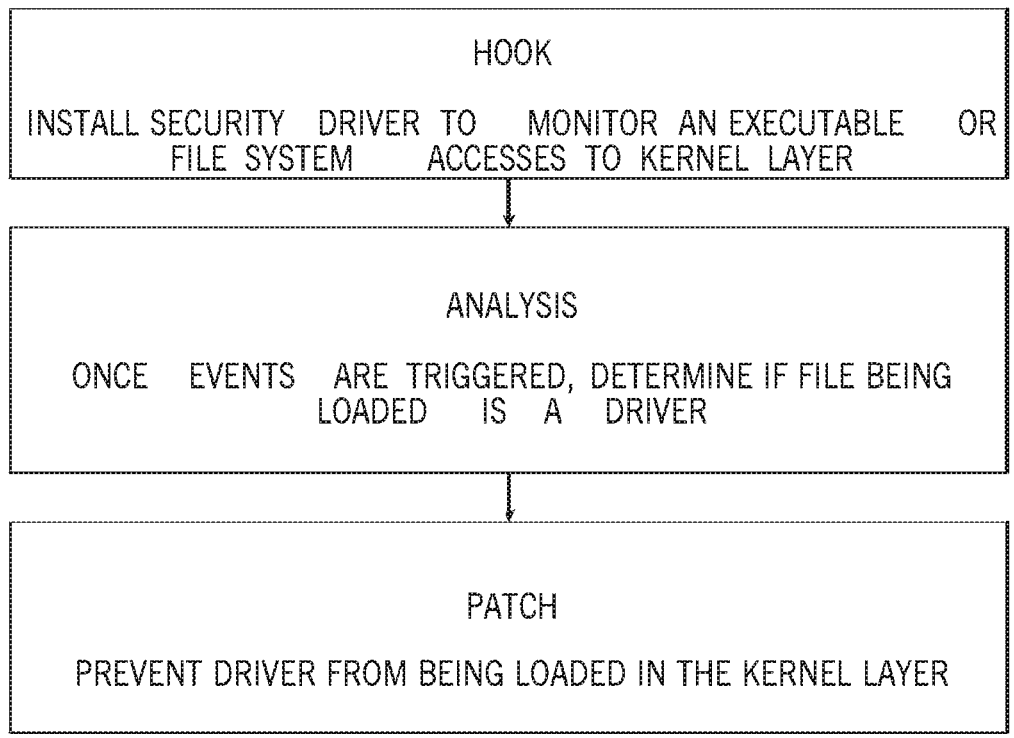
FIG. 1 is a flowchart illustrating an embodiment of a method according to aspects of the present invention.

As seen in reference to FIG. 1, a security driver according to aspects of the invention is loaded in a kernel space and is configured to register a filter to provide a notification in the event of an ImageLoad and for a second method we register a FileSystem filter. To achieve this, a call of the PsSetLoadImageNotifyRoutine may be invoked for detection of the ImageLoad. Alternatively, a call of the FltRegisterFilter may be invoked to load a file system filter. So configured, the Windows® kernel will provide a notification on all executables being loaded to the kernel on a first method and all file system related activities for a second method before executing them.

At this stage, for the first method by checking ImageInfo→SystemModeImage and for the second method checking SecurityContext→DesiredAccess, the security driver can detect when the type of image is a driver and it is an executable file. Finally, for the first method, by parsing the PE header of the driver image, the security driver can determine the driver image's entry point and by replacing bytes in its entry point to a "RETN" or similar instruction that can terminate execution of the driver. For the second method, calling an operation cancel function such as FltCancelFileOpen to early terminate the file from being loaded into memory, the security driver can force the driver executable to return and exit, thereby preventing the driver image from executing.

Figure 2:
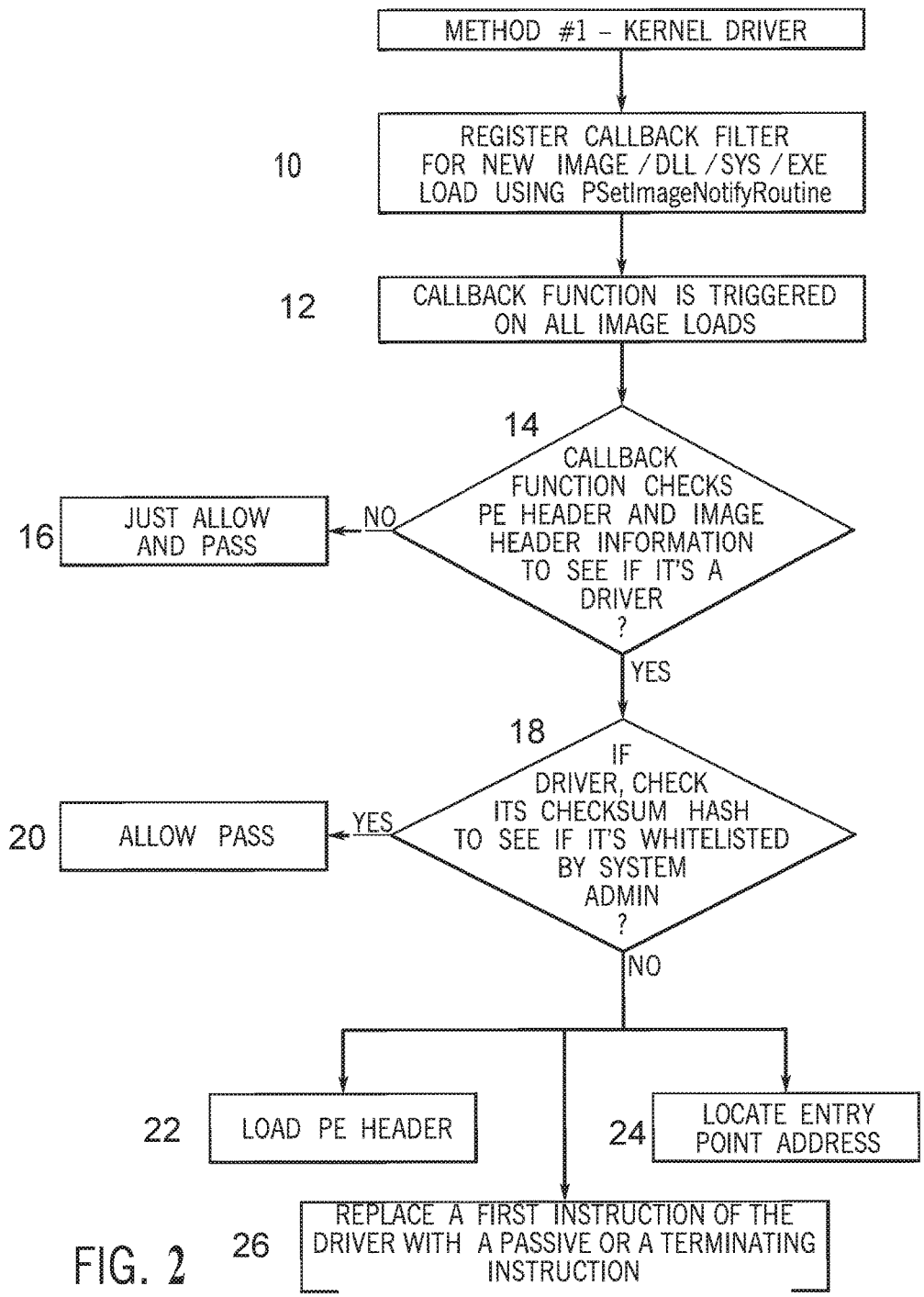
FIG. 2 is a flowchart of a first method of controlling access to a kernel space.

As seen in reference to FIG. 2, a first method according to aspects of the invention may include the following steps. At block 10, registering a security driver that is configured with a notification callback function to detect whether an executable file, such as an image, DLL, SYS, EXE file is attempting to load in a kernel space of the computer. By way of non limiting example, the notification call back function may entail invoking a PsSetLoadImageNotifyRoutine instruction.

At block 12, when the notification callback function detects an executable, then the security driver determines whether the executable is a driver. At block 14, the security driver is configured to perform one or more of parsing a portable executable (PE) header information or an image header information to determine if the executable is a driver based on the contents of the PE header or the image header information. By way of non-limiting example, PE header may be checked for a ProcessId setting set to 0 (zero). Alternatively, the image header information may be checked to determine if an ImageInfo to be SystemModeImage (driver).

If the security driver determines that the executable is not a driver, the executable is allowed to execute at block 16. If the security driver determines that the executable is a driver, optionally, at block 18, the security driver may determine whether the driver has been whitelisted by a system administrator. If the driver has been whitelisted by the system administrator, at block 20 the driver is allowed to execute and pass to the kernel. If the driver has not been whitelisted, or in lieu of the whitelist check at block 18, the security driver then prevents the driver from loading.

To prevent the driver from loading, the security driver may be configured to parse the PE header at 22 and at block 26 apply a patch the PE header with one of a passive or a terminating function. By way of non-limiting example the patch to a newly loaded Image (driver) code in the PE header may be replaced with a return or exit instruction, such as: 0xBB 0x01 0x00 0x00 0xC0 0xC3, which will return and exit as a first instruction in the driver executable. The patch may include a RET, a RETF or any function that would terminate the driver execution. At block 24, the security driver can determine the driver image's entry point and by replacing bytes in its entry point to a "RETN" or similar instruction that can terminate driver.

Figure 3:
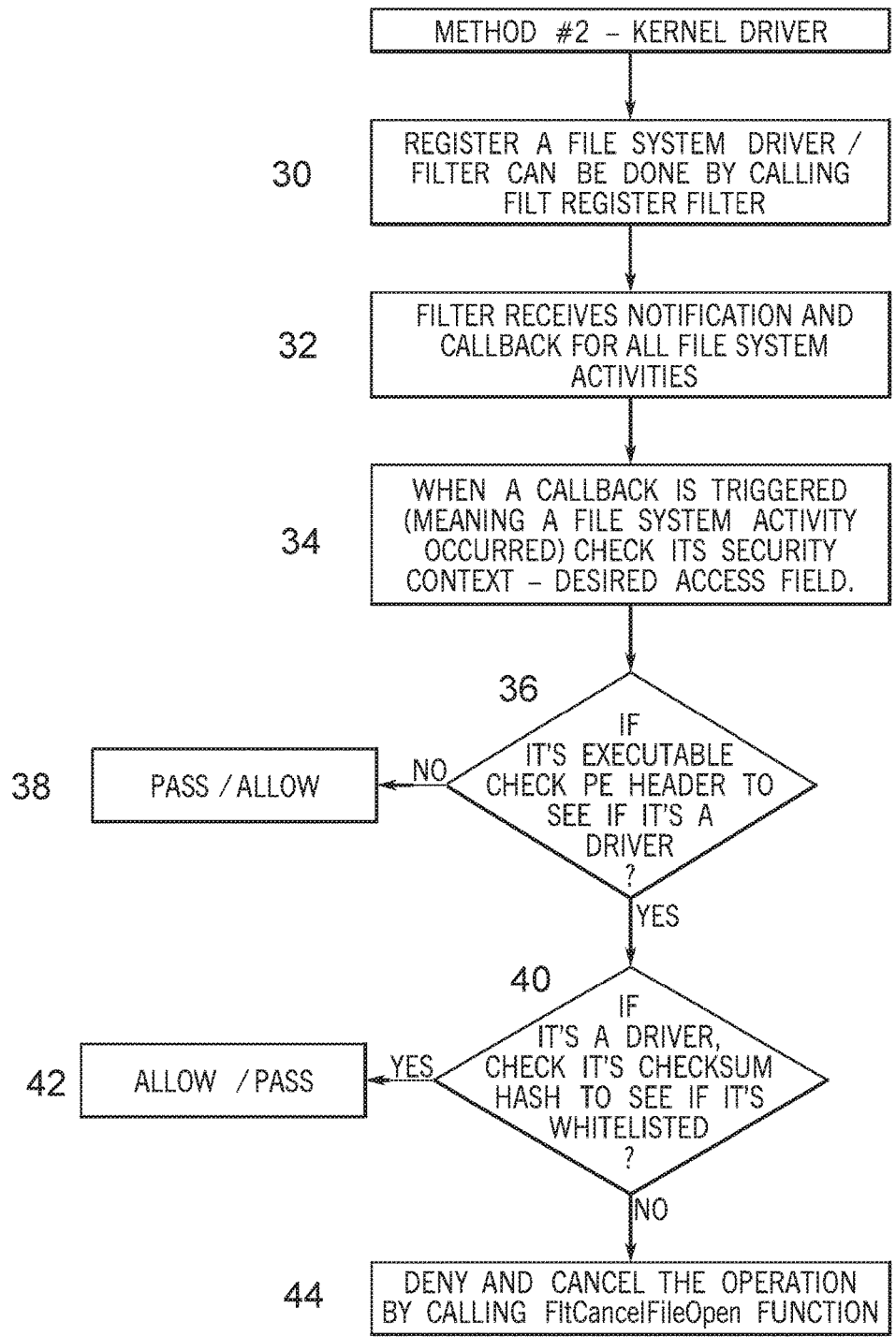
FIG. 3 is a flowchart illustrating a second method of controlling access to a kernel space.

A second method according to aspects of the invention is shown in reference to FIG. 3 and may include the following steps. At block 30 the security driver registers a callback function configured to detect a kernel file system activity and identify whether the file system activity is an executable. By way of non-limiting example, the call back function may invoke a FltRegisterFilter instruction to register a file system filter that provides a notification of a kernel file system activity. At block 32, if the notification call back function is triggered, at block 34 the callback function is configured to determine whether the kernel file system activity is associated with an executable. By way of non-limiting example, the callback function may invoke a SecurityContext→DesiredAccess instruction so that the security driver can determine that the file system activity is associated with an executable.

If the security driver determines that the file system activity is associated with an executable, at block 36 the system is configured to determine whether the executable is a driver. By parsing ImageInfo and determining if it's being loaded with an executable flag.

If the security driver determines that the executable is not a driver, the executable is allowed to execute at block 38. If the security driver determines that the executable is a driver, optionally, at block 40, the security driver may determine whether the driver has been whitelisted by a system administrator. If the driver has been whitelisted by the system administrator, at block 42 the driver is allowed to execute and pass to the kernel. If the driver has not been whitelisted, or in lieu of the whitelist check at block 40, the security driver then prevents the driver from loading.

At block 44, the security driver may prevent the driver from loading by cancelling the file system operation. By way of non-limiting example, the security driver may invoke a call of a FltCancelFileOpen instruction and prevent the file from loading.

The systems and methods of the present invention may be configured to protect all endpoint security products, anti-virus products, sandboxing products and all other security products that secure a Windows® OS to prevent unvetted drivers from accessing the kernel space. The security drivers may be configured to execute automatically or prompt a computer user for a user instruction to load or prevent loading of the driver.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as described herein.

I claim:

1. A computerized system for preventing a driver from loading in a kernel space of an operating system, the system comprising:
 a computer having a user interface; and
 a program product comprising machine-readable program code for causing, when executed, the computer to perform the following process steps:
  registering a security driver in the kernel space of the operating system, the security driver having a notification call back function configured to detect an attempted access of an executable to the kernel space;
  if the call back function is triggered, determining whether the executable is a driver;
  if the executable is a driver, preventing the driver from loading in the kernel space; and
  if the executable is not a driver, allowing the executable to load in the kernel space.

2. The computerized system of claim 1, further comprising:
 determining if the driver image is whitelisted;
 if the driver is whitelisted, allowing the driver image to load in the kernel space; and
 if the driver is not whitelisted, preventing the driver image from loading in the kernel space.

3. The computerized system of claim 1, wherein the method further comprises:
 invoking a PsSetLoadImageNotifyRoutine instruction to detect the attempted loading of the executable.

4. The computerized system of claim 1, wherein the step of determining whether the executable file is a driver further comprises:

parsing a portable executable (PE) header information of the executable to determine if the executable is a driver.

5. The computerized system of claim 4, wherein the step of determining whether the executable file is a driver image further comprises:
parsing an image header information to determine if the executable is a driver.

6. The computerized system of claim 4, wherein the step of determining whether the executable file is a driver image further comprises:
invoking an ImageInfo→SystemModeImage instruction.

7. The computerized system of claim 1, wherein the step of preventing the driver from loading in the kernel space comprises:
patching an entry point of the PE header information with one of a passive or a terminating function.

8. The computerized system of claim 7, wherein the passive function is selected from the group consisting of a Ret, a Retf, and Retn instruction.

9. The computerized system of claim 1, wherein the notification callback function further comprises:
invoking a FltRegisterFilter instruction to detect a file system access in the kernel space.

10. The computerized system of claim 9, further comprising:
on detecting the file system access to the kernel space, invoking a a SecurityContext→DesiredAccess instruction to detect when the type of image is a driver and it is an executable file.

11. A non-transitory computer-readable memory adapted to detect an attempt to load a driver in a kernel layer of the non-transitory computer readable memory, the non-transitory computer-readable memory used to direct a computer of to perform the steps of:
registering a security driver in the kernel space of the operating system, the security driver having a notification call back function configured to detect an attempted access of an executable to the kernel space;
if the call back function is triggered, determining whether the executable is a driver;
if the executable is a driver, preventing the driver from loading in the kernel space; and
if the executable is not a driver, allowing the executable to load in the kernel space.

12. The non-transitory computer-readable memory of claim 11, further comprising the steps of:
determining if the driver imago is whitelisted;
if the driver is whitelisted, allowing the driver to load in the kernel space; and
if the driver is not whitelisted, preventing the driver from loading in the kernel space.

13. The non-transitory computer-readable memory of claim 11, further comprising the steps of:
invoking a PsSetLoadImageNotifyRoutine instruction to detect the attempted loading of the executable.

14. The non-transitory computer-readable memory of claim 11, wherein the step of determining whether the executable file is a driver image further comprises:
parsing a portable executable (PE) header information of the executable to determine if the executable is a driver.

15. The non-transitory computer-readable memory of claim 14, wherein the step of determining whether the executable file is a driver image further comprises:
parsing an image header information to determine if the executable is a driver.

16. The non-transitory computer-readable memory of claim 14, wherein the step of determining whether the executable file is a driver image further comprises:
invoking an ImageInfo→SystemModeImage instruction.

17. The non-transitory computer-readable memory of claim 11, wherein the step of preventing the driver from loading in the kernel space comprises:
patching an entry point of a portable execution (PE) header information with one of a passive or a terminating function.

18. The non-transitory computer-readable memory of claim 17, wherein the passive function is selected from the group consisting of a Ret, a Retf, and Retn instruction.

19. The computerized system of claim 11, wherein the notification callback function further comprises:
invoking a FltRegisterFilter instruction to detect a file system access in the kernel space.

20. The computerized system of claim 1, wherein preventing the driver from loading in the kernel space comprises:
calling an operation cancel function for the driver.

21. The computerized system of claim 20, wherein the operation cancel function includes invoking a FltCancelFileOpen instruction.

22. The computerized system of claim 1, wherein preventing the driver from loading in the kernel space comprises:
calling an operation cancel function for the driver.

23. The computerized system of claim 22, wherein the operation cancel function includes invoking a FltCancelFileOpen instruction.

* * * * *